US008363122B2

United States Patent
Onozawa

(10) Patent No.: US 8,363,122 B2
(45) Date of Patent: Jan. 29, 2013

(54) IMAGE TAKING APPARATUS EXECUTE SHOOTING CONTROL DEPENDING ON FACE LOCATION

(75) Inventor: Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 718 days.

(21) Appl. No.: 12/152,363

(22) Filed: May 14, 2008

(65) Prior Publication Data

US 2008/0309788 A1  Dec. 18, 2008

(30) Foreign Application Priority Data

May 17, 2007  (JP) ................................. 2007-131734

(51) Int. Cl.
- *H04N 5/228* (2006.01)
- *H04N 5/33* (2006.01)
- *H04N 5/222* (2006.01)

(52) U.S. Cl. ................. 348/222.1; 348/333.11; 348/169; 348/333.02

(58) Field of Classification Search ............... 348/222.1, 348/333.11, 169, 333.02
See application file for complete search history.

(56) References Cited

U.S. PATENT DOCUMENTS

| | | | |
|---|---|---|---|
| 7,376,347 B2 | 5/2008 | Sugimoto | |
| 7,769,285 B2 | 8/2010 | Honjo et al. | |
| 7,853,140 B2 | 12/2010 | Sugimoto | |
| 2007/0030375 A1 | 2/2007 | Ogasawara et al. | |
| 2007/0052820 A1* | 3/2007 | Ikeda | 348/231.99 |
| 2007/0065134 A1* | 3/2007 | Sugimoto | 396/165 |
| 2010/0277636 A1 | 11/2010 | Honjo et al. | |

FOREIGN PATENT DOCUMENTS

| | | |
|---|---|---|
| JP | 2005-318515 A | 11/2005 |
| JP | 2006-023798 A | 1/2006 |
| JP | 2006-033440 A | 2/2006 |
| JP | 2007-068147 A | 3/2007 |
| WO | WO 2006/082967 A1 | 8/2006 |

OTHER PUBLICATIONS

Japanese Office Action dated Apr. 26, 2011 (and English translation thereof) in counterpart Japanese Application No. 2007-131734.

* cited by examiner

*Primary Examiner* — Jason Chan
*Assistant Examiner* — Joel Fosselman
(74) *Attorney, Agent, or Firm* — Holtz, Holtz, Goodman & Chick, PC

(57) ABSTRACT

An image taking apparatus includes an image taking system, and a display system, and has a CPU implementing a process to detect subject faces from image frames produced by the image taking system, a process to acquire coordinates of detected subject faces, a process to determine a face detected state or a face undetected state, whichever is concluded in accordance with results of face detection, a process to have, for a determination for the face detected state, a detected-face indicator displayed on the display system in accordance with the coordinates of the acquired subject faces, a process to have, for a determination for the face undetected state, a detected-face indicator having been displayed in a last face detected state till the last displayed on, and a process to execute a shooting control in accordance with a detected-face indicator displayed on the display system.

12 Claims, 7 Drawing Sheets

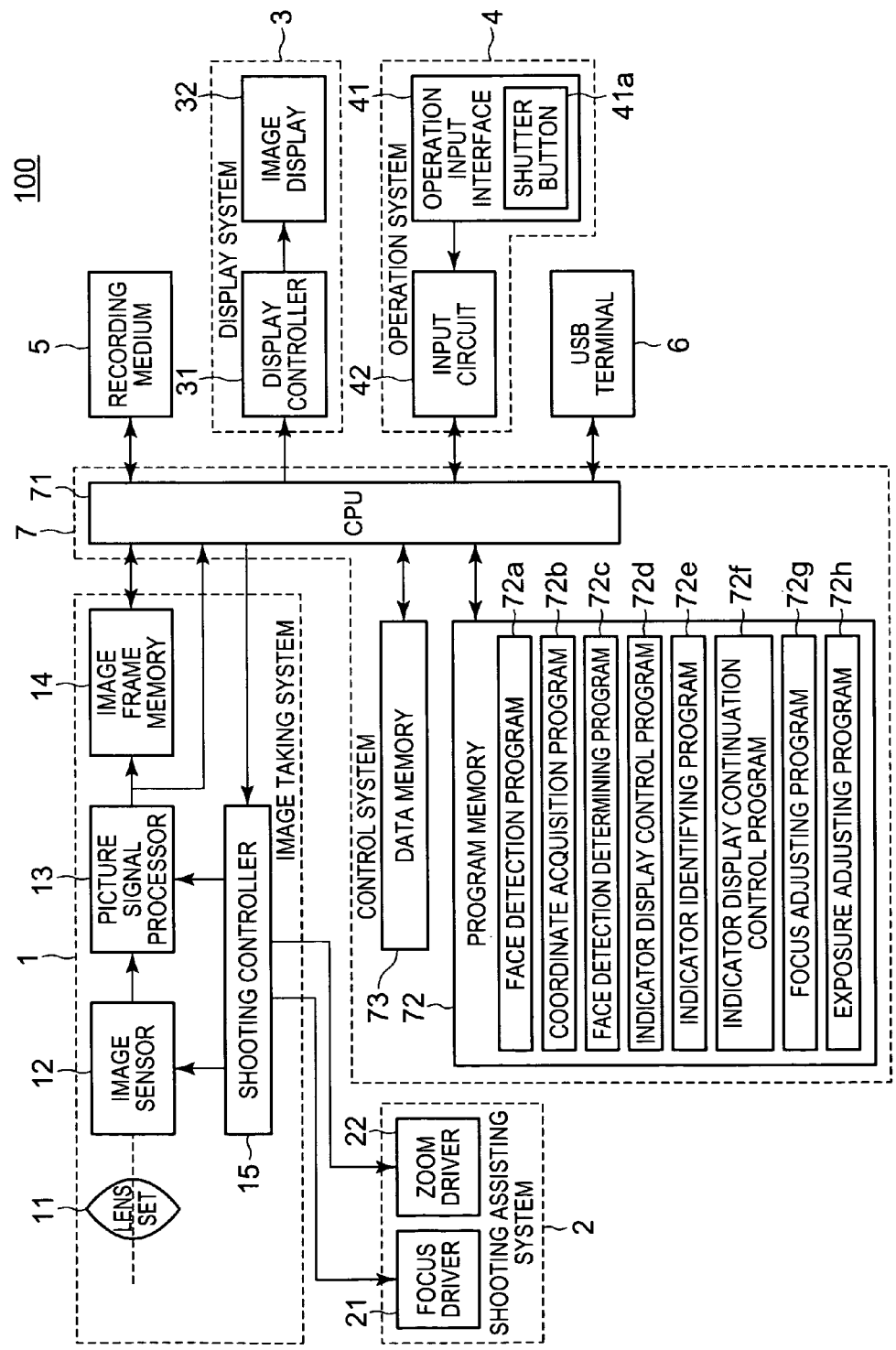

FIG. 3A

| | t_{n-2} | t_{n-1} | t_n | t_{n+1} | t_{n+2} | t_{n+3} | t_{n+4} | t_{n+5} | ... |
|---|---|---|---|---|---|---|---|---|---|
| FACE (x1, y1) | ○ | ○ | ○ | ○ | ○ | ○ | ○ | ○ | ... |
| FACE (x2, y2) | ○ | ○ | ○ | × | × | × | × | × | ... |
| FACE (x3, y3) | ○ | ○ | ○ | ○ | ○ | × | × | × | ... |
| FACE (x4, y4) | ○ | ○ | ○ | ○ | ○ | ○ | ○ | ○ | ... |

FIG. 3B

| | ... | t_{n+m} | t_{n+m+1} | t_{n+m+2} | t_{n+m+3} | t_{n+m+4} | t_{n+m+5} | t_{n+m+6} |
|---|---|---|---|---|---|---|---|---|
| FACE (x1, y1) | ... | × | × | × | × | × | × | × |
| FACE (x2, y2) | ... | × | × | × | × | × | × | × |
| FACE (x3, y3) | ... | × | × | × | × | × | × | × |
| FACE (x4, y4) | ... | ○ | × | × | × | × | × | × |

FIG. 4

| | $t_n$ | $t_{n+1}$ | $t_{n+2}$ | $t_{n+3}$ | $t_{n+4}$ | $t_{n+5}$ | ... | $t_{n+m}$ | $t_{n+m+1}$ | $t_{n+m+2}$ | $t_{n+m+3}$ | $t_{n+m+4}$ | $t_{n+m+5}$ | $t_{n+m+6}$ |
|---|---|---|---|---|---|---|---|---|---|---|---|---|---|---|
| INDICATOR A1 (X1, Y1) | ooo | ooo | ooo | ooo | ooo | ooo | ... | xxx | xxx | xxx | xxx | xxx | xxx | xxx |
| INDICATOR A2 (X2, Y2) | ooo | oox | oxx | xxx | xxx | xxx | ... | xxx | xxx | xxx | xxx | xxx | xxx | xxx |
| INDICATOR A3 (X3, Y3) | ooo | ooo | ooo | oox | oxx | xxx | ... | xxx | xxx | xxx | xxx | xxx | xxx | xxx |
| INDICATOR A4 (X4, Y4) | ooo | ooo | ooo | ooo | ooo | ooo | ... | ooo | oox | oxx | xxx | xxx | xxx | xxx |
| DISPLAYED INDICATOR NUMBER | 4 | 4 | 4 | 3 | 3 | 2 | ... | 1 | 1 | 1 | 1 | 1 | 1 | 0 | ly
IMAGE TAKING APPARATUS EXECUTE SHOOTING CONTROL DEPENDING ON FACE LOCATION

CROSS REFERENCE TO RELATED APPLICATION

This application is based upon and claims the benefit of priority from Japanese Patent Application No. 2007-131734, filed on May 17, 2007, the entire contents of which are incorporated herein by reference.

BACKGROUND OF THE INVENTION

1. Field of the Invention

The present invention relates to an image taking apparatus adapted for taking an image of a subject.

2. Description of the Related Art

General digital still cameras acquire a photometric value such as by a center-weighted exposure metering or averaging exposure metering, and use the acquired photometric value to execute an automatic exposure control. Past the automatic exposure control, digital still cameras execute an automatic focus control. However, absent a desirable subject, such as a figure at a center or such in a range of picture, they may fail in execution of an exact automatic exposure control or automatic focus control. To this point, there are some adapted to detect a location of face for execution of, among others, an automatic exposure control and an automatic focus control.

For those adapted for execution of, among others, an automatic exposure control and an automatic focus control depending on a face location, the mode of photometry is changed to a center-weighted exposure metering or such, upon a lost of face in the sight. And, upon re-detection of a face, the mode of photometry is changed to a photometric scheme to take the face as a subject. That is, even for a temporary lost of face, the mode of photometry is changed, disabling the user to take an image of a subject in a simple and convenient manner. In this regard, development is made of such one that is adapted, even in a temporary failure in detection of a face, to continue displaying a detected-face indicator that represents a location of face of the subject, depending on a duration of time in which the detected-face indicator has been displayed.

However, for the above-noted digital still camera, a time duration for a detected-face indicator to be displayed in a face-undetected state is varied in dependence on a time duration for a detected-face indicator having been displayed in a face-detected state, so that the display time may be random, resulting in an inadequate shooting control. Further, with appearances and disappearances of detected-face indicators, the user may feel a bothersome.

It is an object of the present invention to provide an image taking apparatus permitting a display of detected-face indicator to be performed for a possibly long time, allowing for an adequate execution of shooting control over a long time depending on a location of face.

SUMMARY OF THE INVENTION

According to the present invention, for an image taking control to be executed depending on a displayed detected-face indicator, a detected-face indicator is displayed in accordance with a coordinate of a face in a detection state of the face, and in an undetected state of the face, a detected-face indicator having been displayed in a last detection state of the face is displayed on.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 1 is a configuration illustrating block diagram of an image taking apparatus according to an embodiment of the present invention;

FIGS. 3A and 3B are tables showing, in correspondence to image frame updating timings, sets of results of face detection processes by the image taking apparatus of FIG. 1;

FIG. 4 is a table showing, in correspondence to image frame updating timings, combinations of sets of results of face detection determining processes and number of detected-face indicators displayed by the image taking apparatus of FIG. 1;

DETAILED DESCRIPTION OF THE PREFERRED EMBODIMENTS

There will de described below the preferred embodiments of the present invention with reference to the drawings. It is noted that the invention is not limited to illustrated embodiments. FIG. 1 shows, in a configuration illustrating block diagram, an image taking apparatus 100 according to an embodiment of the present invention.

Figure 2A:
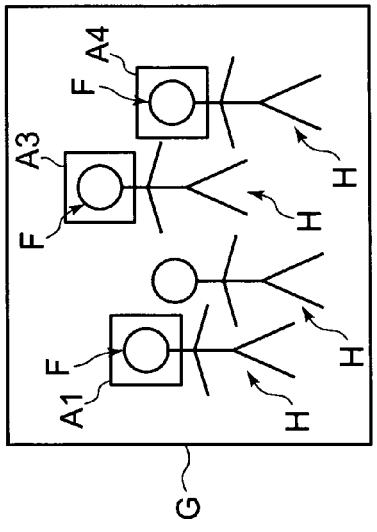
FIGS. 2A to 2D are schematic illustrations of exemplary image frames displayed on a display of the image taking apparatus of FIG. 1.
Figure 2B:
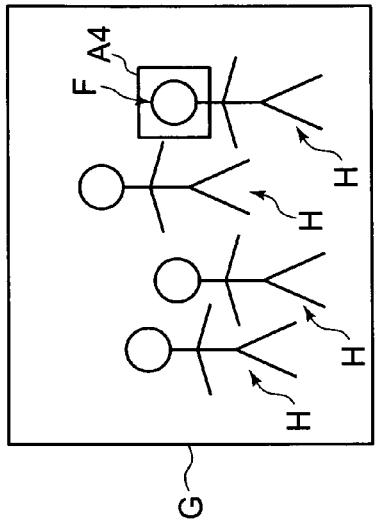
Figure 2C:
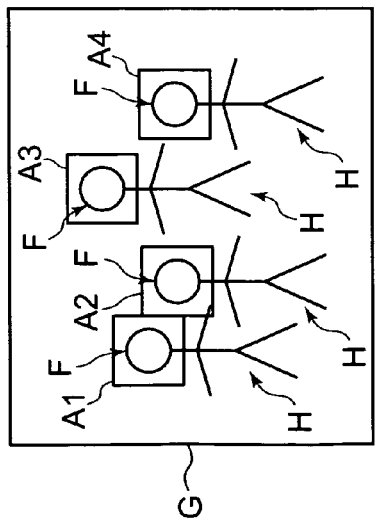

In the present embodiment, the image taking apparatus 100 is adapted to execute a face detection process for detection of a face or faces F (see e.g. FIG. 2A) of a subject or subjects, and in an undetected state of face F, to depend on a coordinate of a face F having been acquired in a last face detected state to have a detected-face indicator (see e.g. a detected-face indicator A4 in FIG. 2D) displayed in an ongoing manner, for a shooting control of an image to be taken in accordance with the detected-face indicator as a reference. For a specific configuration, the image taking apparatus 100 is made up, as illustrated in FIG. 1, by an image taking system 1, a shooting assisting system 2, a display system 3, an operation system 4, a recording medium 5, an USB terminal 6, a control system 7, etc.

The image taking system 1 is configured as a set of image taking means for consecutively taking images of a subject to create a sequence of image frames G. More specifically, the image taking system 1 includes a lens set 11, an electronic image sensor 12, a picture signal processor 13, an image frame memory 14, a shooting controller 15, etc.

The lens set 11 is composed of a plurality of image taking lens. The electronic image sensor 12 is configured with a charge coupled device (CCD), complementary metal-oxide semiconductor (CMOS), or such that converts an image of a subject, as it has passed the lens set 11, into a signal of two-dimensional image frame. The picture signal processor 13 is configured for a prescribed image processing of an image frame signal output from the electronic image sensor 12. The image frame memory 14 is adapted for temporary storage of image frame signals after the image processing.

The shooting controller 15 is adapted, under control of a CPU 71, to control the electronic image sensor 12 and the picture signal processor 13. More specifically, the shooting controller 15 is adapted for control for the electronic image sensor 12 to make a shot of a subject within a given exposure time, and for execution of a processing to read an image frame signal (of an image frame G) from a region for the shot of the electronic image sensor 12 by a preset frame rate.

The shooting assisting system 2 is adapted to drive the image taking system 1 when making a shot of a subject, and includes a focus driver 21, a zoom driver 22, etc.

The focus driver 21 drives a focus mechanism (not shown) operatively connected to the lens set 11. The zoom driver 22 drives a zoom mechanism (not shown) operatively connected to the lens set 11. Both focus driver 21 and zoom driver 22 are connected to the shooting controller 15, and work as drives under control of the shooting controller 15.

The display system 3 is adapted to display a frame of image taken by the image taking system 1, and includes a display controller 31, an image display 32, etc.

The display controller 31 has a video memory (not shown) adapted for temporary storage of display data output from the CPU 71 as necessary.

The image display 32 includes a liquid crystal monitor or the like for displaying a given image frame, such as a frame G (see e.g. FIG. 2A) of image taken by the image taking system 1, in accordance with a signal output from the display controller 31. The image display 32 is adapted to display a detected-face indicator or detected-face indicators (see e.g. detected-face indicators A1 to A4 in FIG. 2A) superimposed on a face or faces F detected in a later-described face detection process. More specifically, the image display 32 is adapted, when taking images of a plurality of (e.g. four) figures H as subjects as illustrated in FIG. 2A to FIG. 2D, to sequentially display image frames G created by the image taking system 1. Given faces F detected in an associated face detection process, the image display 32 displays substantially rectangular detected-face indicators A1 to A4 to superimpose on those faces F.

The detected-face indicators A1 to A4 are illustrated in a rectangular shape, while the indicator shape is not limited thereto, and may have an arbitrary shape subject to an identifiable correspondence to an associated face F.

The operation system 4 is adapted for prescribed operations of the image taking apparatus 100, and includes an operation input interface 41 provided with a shutter button 41a and the like, an input circuit 42, etc.

The shutter button 41a is configured for two-staged pressing operations being a half-press and a full-press, to output prescribed operation signals in accordance with operation stages. More specifically, the shutter button 41a is adapted, when half-pressed, to output an execution instruction for an automatic focusing process (AF) or such under control of the control system 7, and when full-pressed, to output an execution instruction for an actual shot of image to be taken (as an image frame to be recorded) by the image taking system 1.

The input circuit 42 is configured to input to the CPU 71 a signal of operation input from the operation input interface 41.

The recording medium 5 includes a card type nonvolatile memory (flash memory), hard disk or such, and is adapted to record files of frames G of image shot by the image taking system 1.

The USB terminal 6 serves as a terminal for external connection, and is adapted for transmission and reception of data such as by a USB cable (not shown).

The control system 7 governs the image taking apparatus 100, and includes the CPU 71, a program memory 72, a data memory 73, etc.

The CPU 71 is adapted for varieties of control actions to be performed in accordance with programs stored in the program memory 72 for necessary processes in the image taking apparatus 100.

The data memory 73 includes a flash memory or such, and is adapted for temporary storage of data to be processed by the CPU 71. More specifically, the data memory 73 is adapted to store therein sets of coordinates of faces F (face coordinates) at preset timings $t_n$ acquired in a later-described coordinate acquisition process.

The program memory 72 serves for storage of programs and data as necessary for actions of the CPU 71. More specifically, the program memory 72 has stored therein a face detection program 72a, a coordinate acquisition program 72b, a face detection determining program 72c, a indicator display control program 72d, a indicator identifying program 72e, a indicator display continuation control program 72f, a focus adjusting program 72g, an exposure adjusting program 72h, etc.

The face detection program 72a makes the CPU 71 work as a face detection means. That is, the face detection program 72a serves for the CPU 71 to implement a function for execution of a face detection process to sequentially detect faces F of a plurality of (e.g. four) subjects from image frames G created by the image taking system 1.

For example, the CPU 71 executes the face detection program 72a to thereby: have, for each timing (e.g. for each of preset points in time $t_{n-2}$ to $t_{n+m+5}$, where n and m are arbitrary integers, see FIG. 3A and FIG. 3B) for the image display 32 to update a displayed image frame, a plurality of face search frames scan, in a preset direction, a face search range covering an entirety of a respective one of associated image frames G; identify sets of characteristic parts (face parts) corresponding to combinations of eyes, nose, mouth, and the like; determine, from positional relationships of those face parts, whether or not they constitute faces F; and detect regions of face search frames determined to be faces F, if any, as face regions. When the face region is detected in a current image frame G, the CPU 71 sets a face search region at corresponding position of the detected face region on a subsequent image frame G, and makes scans for faces over the face search region with their preset vicinities inclusive.

The coordinate acquisition program 72b makes the CPU 71 work as a coordinate acquisition means. That is, the coordinate acquisition program 72b serves as a program for the CPU 71 to implement a function for execution of a coordinate acquisition process to acquire coordinates (face coordinates) of faces F detected in an associated face detection process. More specifically, the CPU 71 executes the coordinate acquisition program 72b to thereby acquire a set of coordinates (e.g. face coordinates {(x1, y1), (x2, y2), (x3, y3), (x4, y4)}, see FIG. 3A and FIG. 3B) of center positions of faces F detected in a face detection process.

The face detection determining program 72c makes the CPU 71 work as a face detection determining means. That is, the CPU 71 executes the face detection determining program 72c to thereby determine a face detected state or a face undetected state, whichever is concluded in accordance with results of associated face detection processes. More specifically, by execution of the face detection determining program 72c, the CPU 71 works to determine a face detected state or a face undetected state, whichever is concluded depending on a set of results of scans for a face F on consecutive three image frames G in the face detection processes. In other words, for a respective one of detected-face indicators, the CPU 71 determines, if a face F is detected in any one of the consecutive three image frames G, that it is in a face detected state, and does determine, unless a face F is detected in any image frame G, that it is in a face undetected state.

Description is now made of a detected-face indicator A2 taken as an example. Since a face is detected in each of image frames G at time points $t_{n-2}$ through $t_n$ (as shown by a 'round' mark in an associated column in FIG. 3A or 3B and FIG. 4) the CPU 71 determines this to be in a face detected state at a time point $t_n$. Further, the CPU 71 determines it in a face detected state at a subsequent time point $t_{n+1}$, where those faces described are detected in the image frames G at the time points $t_{n-1}$ and $t_n$, although no face is detected in an image frame G at the time point $t_{n+1}$ itself (as shown by an 'X' mark in an associated column in FIG. 3A or 3B and FIG. 4). Again, the CPU 71 makes a determination for a face detected state at a still subsequent time point $t_{n+2}$, where the above-noted face is detected in the image frame G at the time point $t_n$, although no face is detected in an image frame G at the time point $t_{n+2}$ itself. However, at a yet subsequent time point $t_{n+3}$, where no faces are detected in image frames G at the time points $t_{n+1}$ through $t_{n+3}$, the CPU 71 makes a determination for a face undetected state (as shown by a 'shaded' background of an associated column in FIG. 4).

The indicator display control program 72d makes the CPU 71 work as a indicator display control means. That is, the indicator display control program 72d serves for the CPU 71 to implement a function for execution of a process to have, for a determination made for a face detected state in an associated face detection determining process, the image display 32 display a detected-face indicator in accordance with a set of coordinates of an associated face F acquired in an associated face coordinate acquisition process. More specifically, the CPU 71 executes the indicator display control program 72d to calculate coordinates (X1, Y1), (X2, Y2), (X3, Y3), and (X4, Y4) of centers of detected-face indicators A1 to A4 averaging coordinates of faces F acquired from consecutive three image frames G in the face coordinate acquisition process.

In the case of display of a detected-face indicator A1 at the time point $t_n$, letting (X1, Y1) be a center coordinate of the detected-face indicator A1, the CPU 71 calculates the center coordinate (X1, Y1) of detected-face indicator A1 by averaging of a set of face coordinates (x1 ($t_{n-2}$), y1 ($t_{n-2}$)), (x1 ($t_{n-1}$), y1 ($t_{n-1}$)), (x1 ($t_n$), y1 ($t_n$)) acquired in face coordinate acquisition processes at time points $t_{n-2}$ through $t_n$, with following a formula (1), such that:

$$(X1,\ Y1) = \left( \frac{x1(t_{n-2}) + x1(t_{n-1}) + x1(t_n)}{3},\ \frac{y1(t_{n-2}) + y1(t_{n-1}) + y1(t_n)}{3} \right) \quad (1)$$

If a failed acquisition of a face coordinate due to a failed face detection occurs at any one of the time points $t_{n-2}$ through $t_n$, the CPU 71 calculates the center coordinate (X1, Y1) of detected-face indicator A1 by averaging simply using face coordinates of detected faces, following a formula (2) to calculate the center coordinate (X1, Y1) of detected-face indicator A1, such that:

$$(X1,\ Y1) = \left( \frac{x1(t_\alpha) + x1(t_\beta)}{2},\ \frac{y1(t_\alpha) + y1(t_\beta)}{2} \right) \quad (2)$$

where $\alpha$ and $\beta$ each represent any one of integers n−2, n−1, and n, and $\alpha \neq \beta$.

Further, if a failed acquisition of face coordinates due to failures in detection of faces occurs at any two of the time points $t_{n-2}$ through $t_n$, the CPU 71 calculates simply using a face coordinate of a detected face to determine the center coordinate (X1, Y1) of detected-face indicator A1, with a formula (3) such that:

$$(X1,\ Y1) = (x1(t_\gamma), y1(t_\gamma)) \quad (3)$$

where $\gamma$ represents any one of integers n−2, n−1, and n.

The CPU 71 is thus adapted to work as an average coordinate calculation means for averaging coordinates of faces F acquired in associated face coordinate acquisition processes to calculate coordinates of detected-face indicators.

After calculation of center coordinates of detected-face indicators, the CPU 71 controls the display system 3 to superimpose the detected-face indicators on associated face regions in display 32 (see FIGS. 2A to 2D). More specifically, for four human figures H in an image frame G, the CPU 71 works to display their detected-face indicators in order from the left end, like detected-face indicators A1 to A4, in accordance with their face detected states.

Figure 2D:
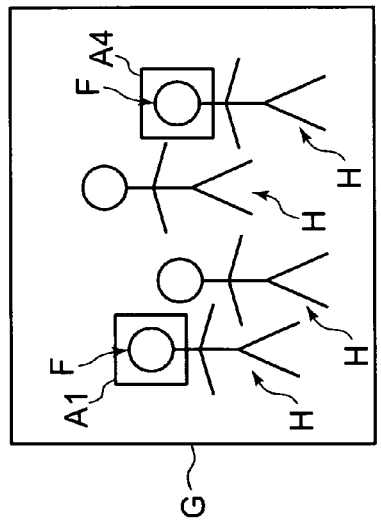

For example, it works: for face detection status in that all of four faces are detected (e.g. at the time points $t_n$ through $t_{n+2}$, see FIG. 4), the CPU 71 displays all of detected-face indicators A1 to A4 (see FIG. 2A); for face detection status in that only three f faces are detected and a face F of a second figure from the left is not detected (e.g. at the time point $t_{n+3}$ and a time point $t_{n+4}$, see FIG. 4), the CPU 71 displays detected-face indicators A1, A3, and A4 (see FIG. 2B); for face detection status in that only two faces are detected and faces F of inner two figures are not detected (e.g. at a time point $t_{n+5}$, see FIG. 4), the CPU 71 displays detected-face indicators A1 and A4 (see FIG. 2C); and for a face detection status in that only a one face of figure at the right end is detected (e.g. at any one of time points $t_{n+m}$ through $t_{n+m+2}$, see FIG. 4), the CPU 71 simply displays a detected-face indicator A1 (see FIG. 2D).

Figure 5:
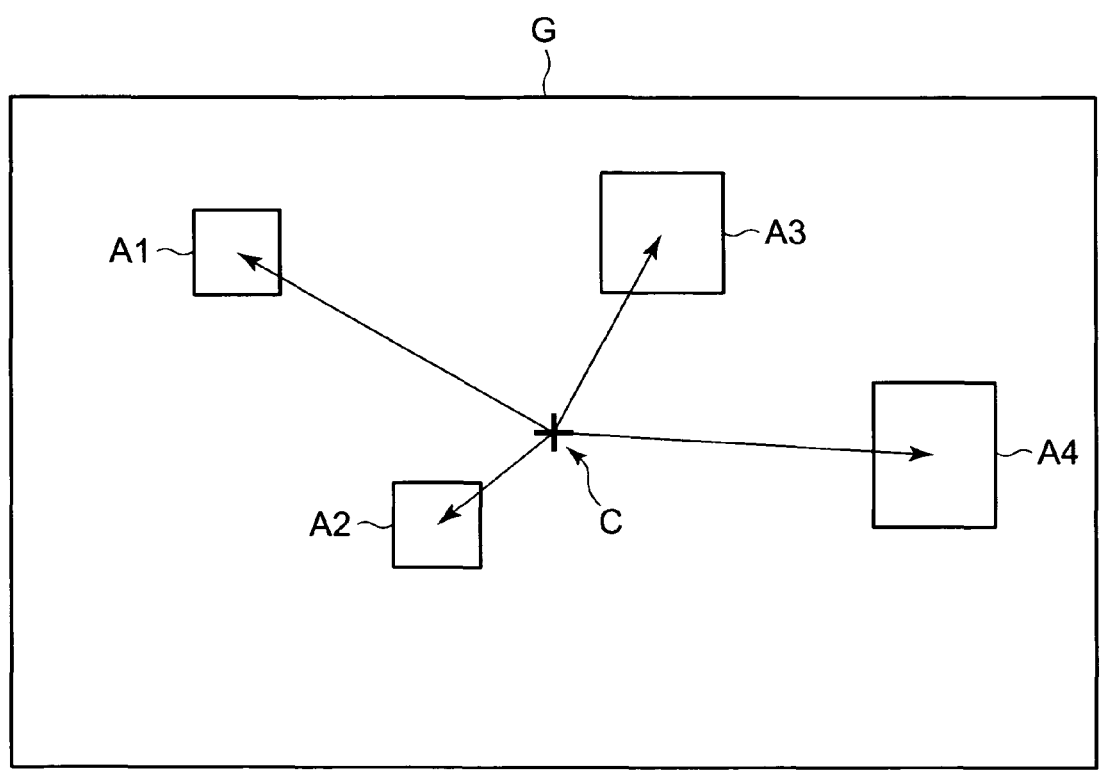
FIG. 5 is a schematic illustration of an exemplary set of detected-face indicators displayed on the display of the image taking apparatus of FIG. 1.

The indicator identifying program 72e makes the CPU 71 work as a indicator identifying means. That is, the indicator identifying program 72e serves for the CPU 71 to implement a function for execution of a indicator identifying process to identify a indicator as a reference of the shooting control for a shot of a subject by the image talking system 1, among detected-face indicators displayed in a indicator display control process (see FIG. 5), depending on sizes S, distances R from a diagonal center C, and faceness values P of faces F detected in associated face detection processes. The size S of a face F is calculated depending on the area of a face region determined as a face F in an associated face detection process. The faceness value P of a face F is calculated depending on evaluated values of characteristic parts corresponding to eyes, nose, mouth, or the like determined in an associated face detection process. For a face F for a detected-face indicator A1, designated by S1 is the size, R1 is the distance from the diagonal center C, and P1 is the faceness value. Likewise, for faces F for detected-face indicators A2 to A4, designated by S2, S3, and S4 are their sizes, R2, R3, and R4 are their distances from the diagonal center C, and P2, P3, and P4 are their faceness values.

The CPU 71 executes the indicator identifying program 72e to thereby work for detected-face indicators A1 to A4, to divide the distances R1 to R4 from the diagonal center C by the sizes S1 to S4 of the faces F, correct the results by the faceness values P1 to P4, and identify such one that has a best result, as a reference detected-face indicator. The method of identifying a reference detected-face indicator is not limited to that described above as an example.

The indicator display continuation control program 72f makes the CPU 71 work as a indicator display continuation control means. That is, the indicator display continuation control program 72f serves for the CPU 71 to implement a function for execution of a process to control the image display 32, for a determination made for a face undetected state in an associated face detection determining process, to have a detected-face indicator displayed on, as it has been displayed in a last face detected state.

More specifically, the CPU 71 executes the indicator display continuation control program 72f to thereby work: for four detected-face indicators A1 to A4 determined to be all in their face undetected states in a face detection determining process (e.g. at a time point $t_{n+m+3}$, see FIG. 4), to determine whether or not one or more face detected states are found in any one of a prescribed number of image frames G as a last set (e.g. a set of three image frames at time points $t_{n+m}$ through $t_{n+m+2}$, see FIG. 4); and for a determination made for presence of one or more face detected states, to have, among the originally four detected-face indicators A1 to A4, any one (e.g. a detected-face indicator A4 at the time points $t_{n+m}$ through $t_{n+m+2}$, refer to FIG. 2D) displayed on, as this detected-face indicator has been displayed till the last in a last face detected state.

In other words, although all detected-face indicators are in their face undetected states (as shown by 'shaded' backgrounds of associated columns in FIG. 4), any one that has been displayed on the image display 32 in a last face detected state is displayed on for a preset duration of time (having 1 as the number of displayed detected-face indicators in FIG. 4).

The focus adjusting program 72g makes the CPU 71 work as a focus adjusting means. That is, the CPU 71 executes the focus adjusting program 72g to thereby perform an automatic focusing process (AF process) for adjusting a focus position of the lens set 11 of the image taking system 1. More specifically, the CPU 71 works in response to a half-press operation of the shutter button 41a by the user, to employ any detected-face indicator as an area for distance measurement (measurement region), for adjusting its focus position by driving the lens set 11 in the direction of an optical axis by the focus driver 21.

The exposure adjusting program 72h makes the CPU 71 work as a brightness adjusting means. More specifically, the CPU 71 executes the exposure adjusting program 72h to thereby implement an automatic exposure process (AE process) for adjusting exposure conditions (e.g. shutter speed, aperture, etc.) for a shooting by the image taking system 1, using any detected-face indicator (prescribed region) as an area for photometry (measurement region). That is, by execution of the exposure adjusting program 72h, the CPU 71 works to adjust the brightness of a frame G of image taken by the image taking system 1, depending on the brightness of a detected-face indicator (prescribed region) in the image frame G.

As described above, the focus adjusting program 72g and the exposure adjusting program 72h serve for the CPU (shooting control means) 71 to implement, when shooting a subject by the image taking system 1, functions for shooting control processes such as, among others, an automatic focus process and an automatic exposure process, depending on a detected-face indicator displayed by an associated indicator display control process as well as a detected-face indicator displayed on by an associated indicator display continuation control process. For no detected-face indicator displayed, the CPU 71 is adapted to perform an automatic exposure control by a photometric scheme such as, among others, a center-weighted exposure metering using a diagonal center as an area for optical measurement, or an averaging exposure metering for a photometry using an entire image frame as an area for optical measurement.

Figure 6:
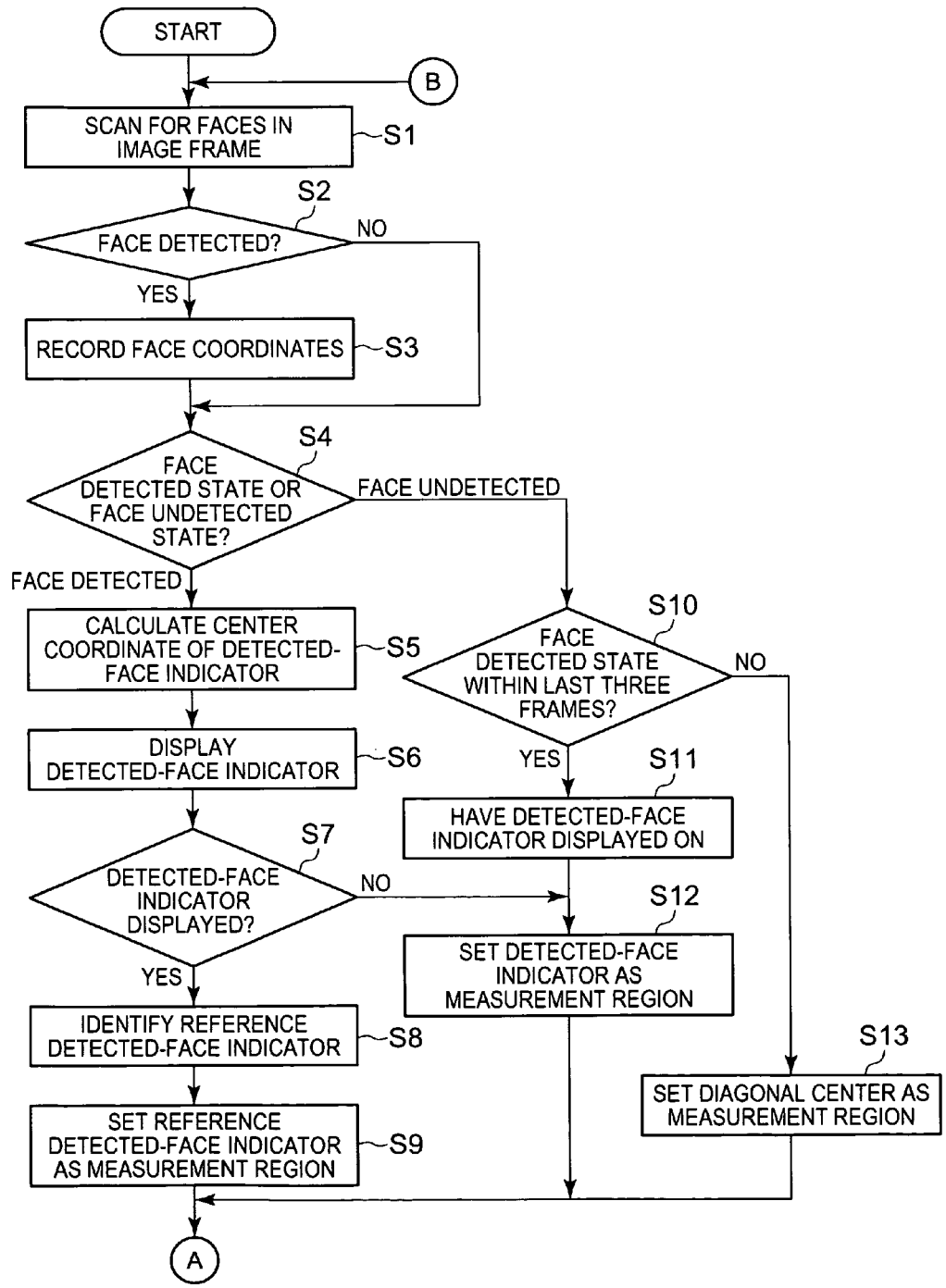
FIG. 6 is a chart of a flow of control actions associated with a shooting process by the image taking apparatus of FIG. 1.
Figure 7:
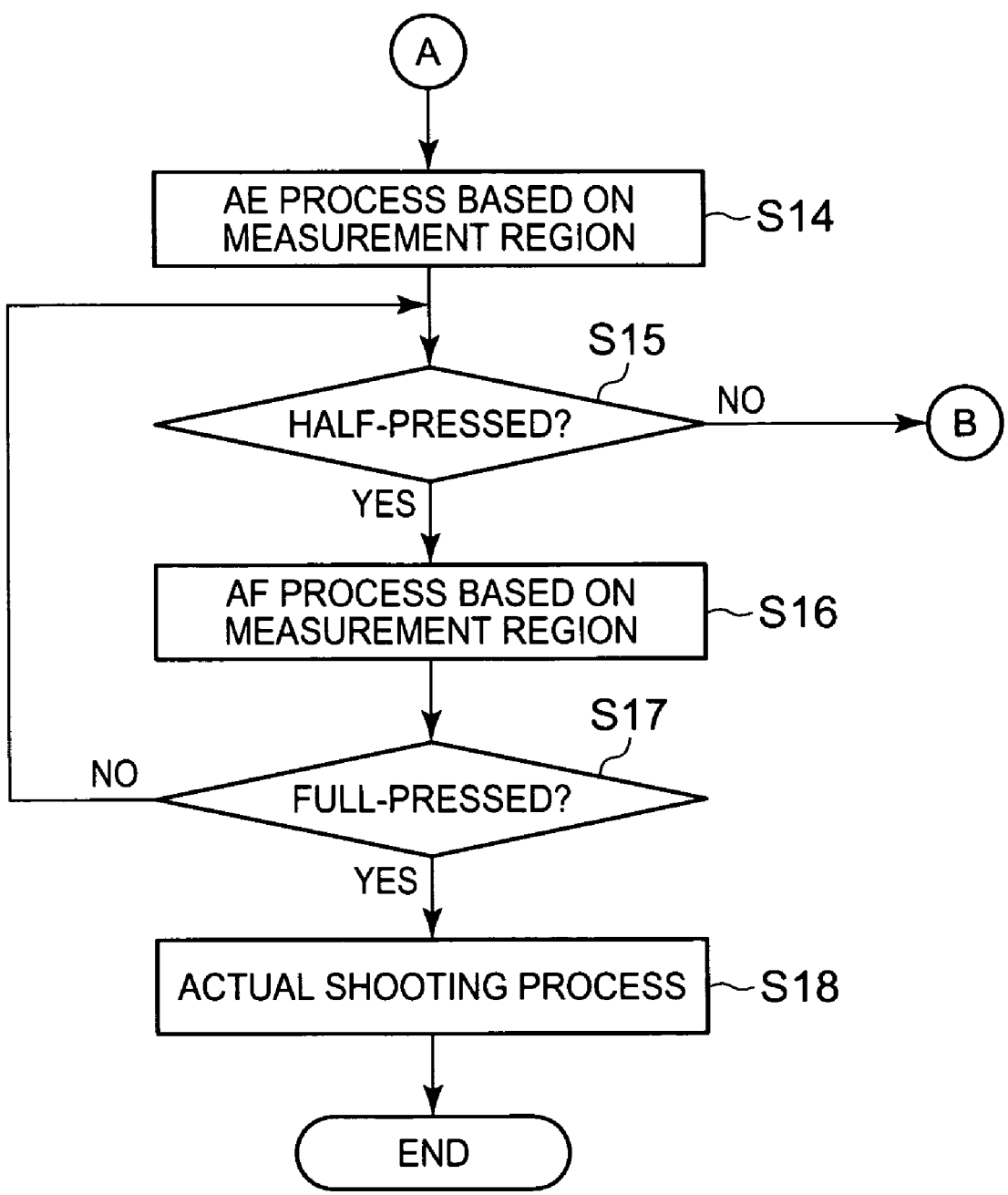
FIG. 7 is a continued chart of the flow of actions of FIG. 6.

Description is now made of a shooting process with reference to FIG. 6 and FIG. 7. FIG. 6 and FIG. 7 cooperatively show in charts a flow of control actions associated with the shooting process. For the shooting process to be described, it is presumed that the data memory 73 has stored therein sets of coordinates of faces F detected in face detections processes at time points $t_{n-2}$ and $t_{n-1}$ as update timings of image frames displayed on the image display 32.

As shown in FIG. 6, when starting a process for shooting a subject by the image taking system 1, the CPU 71 executes the face detection program 72a of the program memory 72, to have face search frames scan for faces F in a face search range covering an entirety of an image frame G created at a time point $t_n$ by the image making system 1 (step S1).

For detected faces F (YES at step S2), the CPU 71 executes the coordinate acquisition program 72b of the program memory 72, to acquire center coordinates (face coordinates) of faces F detected in an associated face detection process, and record those face coordinates (step S3).

After that, the CPU 71 executes the face detection determining program 72c of the program memory 72, to determine a face detected state or a face undetected state, whichever is concluded in accordance with results of detection of faces F at the time points $t_{n-2}$ through $t_n$ (step 4). Also for detection of no faces F at the step S2 (NO at step S2), the CPU 71 executes the process at the step S4.

For determinations for face detected states (FACE DETECTED STATE at the step 4), the CPU 71 executes the indicator display control program 72d of the program memory 72, to acquire from the data memory 73 sets of face coordinates in image frames G at the time points $t_{n-2}$ through $t_n$, and calculate center coordinates of detected-face indicators, following any one of expressions (1) to (3) (step 5), and to display the detected-face indicators on the image display 32, superimposing them on associated face regions (step S6).

Next, the CPU 71 determines whether detected-face indicators are displayed (step S7). For a determination for detected-face indicators displayed (YES at the step S7), the CPU 71 executes the indicator identifying program 72e of the program memory 72, to identify among the detected-face indicators such one that constitutes a reference of shooting control for shooting a subject by the image taking system 1 (step S8), and to set the reference detected-face indicator as a measurement region for, among others, an automatic exposure control and an automatic focus control (step S9).

On the other hand, for a determination for a face undetected state at the step S4, i.e., for a set of consecutive three image frames G having no detected faces F (FACE UNDETECTED STATE at the step S4), the CPU 71 works to determine whether or not a face detected state is found in last three image frames G at time points $t_{n-3}$ through $t_{n-1}$ (step S10).

For a determination for a face detected state (YES at the step 10), the CPU 71 executes the indicator display continuation control program 72f of the program memory 72, to have a single detected-face indicator (e.g. the detected-face indicator A4 at the time point $t_{n+m+2}$) displayed on, as it has been displayed till the last in a last face detected state (step S11). After that, the CPU 71 works to set the displayed single detected-face indicator as a measurement region for, among others, an automatic exposure control and an automatic focus control (step S12).

Also for a single displayed detected-face indicator, not plural, at the step S7 (NO at the step S7), the CPU 71 executes the process of step S12.

Further, for a determination for no face detected state in any of last three image frames G at the step S10 (NO at the step S10), the CPU 71 works to set a diagonal center as a measurement region for, among others, an automatic exposure control and an automatic focus control (step S13).

After that, the CPU 71 executes the exposure adjusting program 72$h$ of the program memory 72, to implement an automatic exposure process using the measurement region set as an area for optical measurement (step S14).

Then, as the shutter button 41$a$ is half-pressed by the user (YES at step S15), the CPU 71 executes the focus adjusting program 72$g$ of the program memory 72, to implement an automatic focus process using the measurement region as an area for distance measurement (step S16).

After that, as the shutter button 41$a$ is full-pressed by the user (YES at step S17), the CPU 71 implements an actual shooting process to have the image taking system 1 conduct a shooting for an actual shot (an image frame to be recorded) in accordance with shooting conditions adjusted in the shooting control process (step S18).

For an avoided full-press operation by the user at the step S17 (NO at the step S17), the control flow goes to the step S15, where the CPU 71 determines whether or not a half-press operation is held on. The CPU 71 repeats such actions until detection of a full-press or cancellation of a half-press.

On the other hand, for no detection of a half-press of the shutter button 41$a$ by the user at the step S15 (NO at the step S15), the control flow goes to the step S15, where the CPU 71 executes a face detection process at an update timing of an image frame displayed on the image display 32.

As will be seen from the foregoing description, in the present embodiment, the image taking apparatus 100 is adapted, given a determination for a face undetected state, to have such one of a plurality of detected-face indicators displayed on for a preset duration of time, that has been displayed on the image display 32 till the last in a last face detected state. Therefore, even in the face undetected state, a detected-face indicator can be displayed for a possibly long duration of time, allowing shooting control processes such as, among others, an automatic focus process and an automatic exposure process to be kept adequate for the longer time duration in accordance with location of a face F associated with the detected-face indicator displayed on the image display 32.

Further, the CPU 71 is adapted to make a determination for a face detected state, when a face F is detected in even one of consecutive three image frames G, and will not make a determination for a face undetected state until detection of no face F in any image frame G. Therefore, faces F can be scanned for in free of appearances and disappearances of detected-face indicators that otherwise might have occurred every time point preset to update scan data, allowing for a reduced bothersome display to the user.

Further, the CPU 71 is adapted for averaging coordinates of faces F acquired from consecutive three image frames G in a face coordinate acquisition process to calculate coordinates of detected-face indicators. Therefore, when a detected-face indicator moves, the motion of detected-face indicator can be smoother, than a detected-face indicator to be displayed depending on a location of an associated face F at a preset time point, thus allowing for provision of an attractive image taking apparatus 100 with an enhanced premium accent.

Further, even in detection of a plurality of faces F, an adequate detected-face indicator can be identified as a reference for shooting control processes, depending on sizes S, distances R from a diagonal center C, and faceness values P of detected faces F, allowing for the more adequate automatic focus process, automatic exposure process, etc.

It is noted that the present invention is not limited to the embodiment described, and various improvements and design changes may be made without departing from the spirit or scope of the invention. For example, the detection being made of a plurality of faces F of subjects in a single image frame G is not limited thereto, and may well be made of at least one face F of subject. Further, the determination being made of a face detected state or a face undetected state, whichever is concluded depending on results of scans for faces F in consecutive three image frames G, is not limited thereto, and may well be made depending on, e.g., results of a scan for a face F in an image frame G at a respective time point $t_n$.

Moreover, in the embodiment described, coordinates of detected-face indicators are calculated by averaging coordinates of faces F acquired from consecutive three image frames G in a face coordinate acquisition process, which may well be calculated depending on coordinates of faces F acquired from an image frame G at a respective time point $t_n$.

Further, in the embodiment described, as a reference for shooting control processes, a detected-face indicator is identified depending on sizes S, distances R from a diagonal center C, and faceness values P of detected faces F, which is not limited thereto, and may well be identified depending on any one of a set of sizes S, a set of distances R from a diagonal center C, and a set of faceness values P of detected faces F.

Still more, the shooting control processes including an automatic focus process and an automatic exposure process as examples described, and not limited thereto, may encompass, e.g., a flash dimming process for controlling the amount of flash light emission (emission time), a color tone adjusting process for adjusting the tone of a flesh color of face F, etc.

Yet more, the image taking apparatus 100 has a configuration exemplified in the embodiment described, which is an example, and not limited thereto.

In addition, in the embodiment described, the CPU 71 is adapted to implement functions of face detection means, coordinate acquisition means, face detection determining means, indicator display control means, indicator display continuation control means, average coordinate calculation means, indicator identifying means, focus adjusting means, and brightness adjusting means by executing prescribed programs or the like, which is not limited thereto, and may be configured with, e.g., logic circuits or the like to implement a variety of functions.

What is claimed is:

1. An image taking apparatus comprising: an imaging unit which produces image frames by taking consecutive images; a display configured to display one of the image frames produced by the imaging unit; a face detector configured to detect at least one face within the displayed image frame; a face coordinate acquirer configured to acquire face coordinates of the at least one detected face; a face detection state determiner configured to determine either a face-detected state or a face-undetected state in accordance with results of the face detection by the face detector, wherein the face-detected state includes one of: (i) a single face detection state in which a single face is detected within the displayed image frame, and (ii) a plural face detection state in which plural faces are detected within the displayed image frame; a first indicator display controller configured to control the display to display respective detected-face indicators based on a plurality of face coordinates acquired by the face coordinate acquirer when the face detection state determiner determines the plural face detection state; a second indicator display controller configured to control the display to display one detected-face indicator based on one face coordinate acquired by the face coordinate acquirer when the face detection state determiner determines the single face detection state; and a shooting controller configured to execute a shooting control based on the detected-face indicators displayed by the first indicator display controller and the second indicator display controller; wherein, in the plural face detection state, when any one of faces detected by the face detector is determined to change from the face-detected state to the face-undetected state while the respective detected-face indicators are displayed, the first indicator display controller controls the display to immediately hide the detected-face indicator of the face determined to change to the face-undetected state; and wherein, in the plural face detection state, when all of the faces detected by the face detector are determined to change from the face-detected state to the face-undetected state, the first indicator display controller controls the display to continuously display for a predetermined period of time at least one of the detected-face indicators of the faces determined to change to the face-undetected state which was most recently in the face-detected state.

2. The image taking apparatus according to claim 1, wherein the face detection state determiner determines the face-detected state or the face-undetected state in accordance with results of face detection from a prescribed number of consecutive image frames by the face detector.

3. The image taking apparatus according to claim 2, wherein the face coordinate acquirer acquires the face coordinates detected from a prescribed number of consecutive image frames by the face detector, and the image taking apparatus further comprises an average coordinate calculator configured to average the face coordinates of a plurality of the image frames acquired by the face coordinate acquirer for calculation of a detected-face indicator coordinate.

4. The image taking apparatus according to claim 1, further comprising an indicator selector configured to select, among the respective displayed detected-face indicators, a detected-face indicator as a reference for the shooting control by the shooting controller in accordance with a predetermined condition.

5. The image taking apparatus according to claim 4, wherein the indicator selector comprises:
a size calculator configured to calculate respective face sizes of the at least one detected face; and
a distance calculator configured to calculate respective distances between a diagonal center of the displayed image frame and the at least one detected face.

6. The image taking apparatus according to claim 5, wherein the indicator selector selects one detected-face indicator as the reference based on at least one of the respective face sizes calculated by the size calculator, the respective distances calculated by the distance calculator, and respective faceness values of the at least one face detected by the face detector.

7. The image taking apparatus according to claim 4, further comprising a measuring region setting unit configured to:
set the detected-face indicator selected by the indicator selector as a measuring region when the respective detected-face indicators are displayed by the first indicator display controller;
set the one detected-face indicator as the measuring region when the one detected-face indicator is displayed by the second indicator display controller; and
set the at least one continuously displayed detected-face indicator as the measuring region when all of the faces detected by the face detector are determined to change from the face-detected state to the face-undetected state.

8. The image taking apparatus according to claim 7, wherein the shooting controller executes the shooting control with respect to the measuring region set by the measuring region setting unit.

9. The image taking apparatus according to claim 1, wherein the shooting controller comprises:
a focus adjuster configured to adjust a focus of a lens set using an associated detected-face indicator as an area for distance measurement; and
a brightness adjuster configured to adjust a brightness of an associated image frame in accordance with a brightness in the associated detected-face indicator of the associated image frame.

10. A non-transitory computer-readable recording medium having a program stored thereon for controlling an image taking apparatus to function as: imaging means for producing image frames by taking consecutive images; displaying means for displaying one of the image frames produced by the imaging means; face detecting means for detecting at least one face within the displayed image frame; face coordinate acquiring means for acquiring face coordinates of the at least one detected face; face detection state determining means for determining, either a face-detected state or a face-undetected state in accordance with results of the face detection by the face detecting means, wherein the face-detected state includes one of: (i) a single face detection state in which a single face is detected within the displayed image frame, and (ii) a plural face detection state in which plural faces are detected within the displayed image frame; first indicator display controlling means for controlling the displaying means to display respective detected-face indicators based on a plurality of face coordinates acquired by the face coordinate acquiring means when the face detection state determining means determines the plural face detection state; second indicator display controlling means for controlling the displaying means to display one detected-face indicator based on one face coordinate acquired by the face coordinate acquiring means when the face detection state determining means determines the single face detection state; and shooting controlling means for executing a shooting control based on the detected-face indicators displayed by the first indicator display controlling means and the second indicator display controlling means; wherein, in the plural face detection state, when any one of faces detected by the face detecting means is determined to change from the face-detected state to the face-undetected state while the respective detected-face indicators are displayed, the first indicator display controlling means controls the displaying means to immediately hide the detected-face indicator of the face determined to change to the face-undetected state; and wherein, in the plural face detection state, when all of the faces detected by the face detecting means are determined to change from the face-detected state to the face-undetected state, the first indicator display controlling means controls the displaying means to continuously display for a predetermined period of time at least one of the detected-face indicators of the faces determined to change to the face-undetected state which was most recently in the face-detected state.

11. An image taking method comprising: producing image frames by taking consecutive images; displaying one of the produced image frames; detecting at least one face within the displayed image frame; acquiring face coordinates of the at least one detected face; determining either a face-detected state or a face-undetected state in accordance with results of the face detection, wherein the face-detected state includes one of: (i) a single face detection state in which a single face is detected within the displayed image frame, and (ii) a plural face detection state in which plural faces are detected within the displayed image frame; controlling to display respective detected-face indicators based on a plurality of the acquired face coordinates when the plural face detection state is determined; controlling to display one detected-face indicator based on one acquired face coordinate when the single face detection state is determined; and executing a shooting control based on the detected-face indicator(s) displayed by the controlling; wherein, in the plural face detection state, when any one of the detected faces is determined to change from the face-detected state to the face-undetected state while the respective detected-face indicators are displayed, the controlling performs control to immediately hide the display of the detected-face indicator of the face determined to change to the face-undetected state; and wherein, in the plural face detection state, when all of the detected faces are determined to change from the face-detected state to the face-undetected state, the controlling performs control to continuously display for a predetermined period of time at least one of the detected-face indicators of the faces determined to change to the face-undetected state which was most recently in the face-detected state.

12. An image taking apparatus comprising: an imaging unit which produces image frames by taking consecutive images; a display configured to display one of the image frames produced by the imaging unit; a face detector configured to detect at least one face within the displayed image frame; a face coordinate acquirer configured to acquire face coordinates of the at least one detected face; a face detection state determiner configured to determine whether some or all of the faces detected by the face detector change from a face-detected state to a face-undetected state based on results of the face detection by the face detector; an indicator display controller configured to control the display to display detected-face indicators based on the face coordinates acquired by the face coordinate acquirer; an indicator display continuation controller configured to: (i) when plural faces are detected within the displayed image frame and the face detection state determiner determines that some of the plural detected faces change from the face-detected state to the face-undetected state, immediately hide the detected-face indicators having been displayed by the indicator display controller in a last face-detected state of the some of the faces in the face-undetected state, and (ii) when plural faces are detected within the displayed image frame and the face detection state determiner determines that all of the plural detected faces change from the face-detected state to the face-undetected state, continuously display for a predetermined period of time at least one of the detected-face indicators having been displayed by the indicator display controller in a last face-detected state from among all of the faces in the face-undetected state; and a shooting controller configured to execute a shooting control based on the detected-face indicators displayed by the indicator display controller and the at least one of the detected-face indicators continuously displayed by the indicator display continuation controller.

* * * * *